No. 647,342. Patented Apr. 10, 1900.
L. J. VOGT.
PHOTOGRAPHIC SHUTTER.
(Application filed Jan. 10, 1898.)
(Model.) 3 Sheets—Sheet 1.
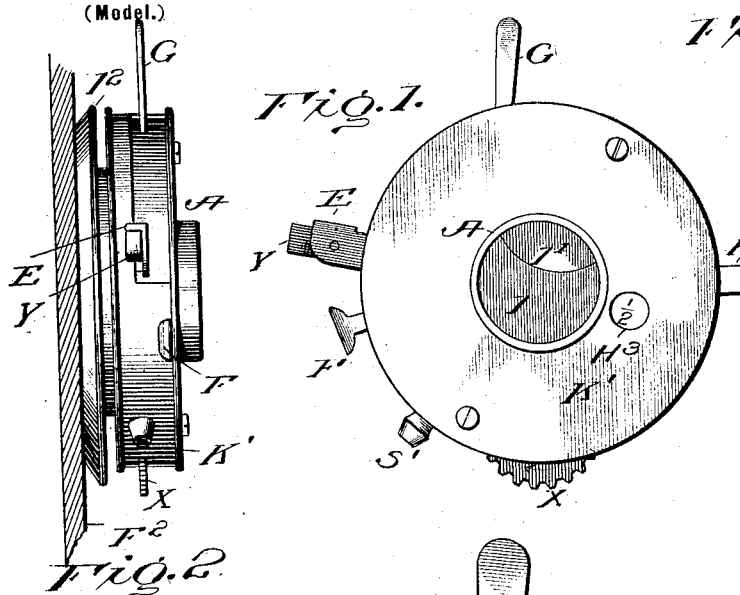
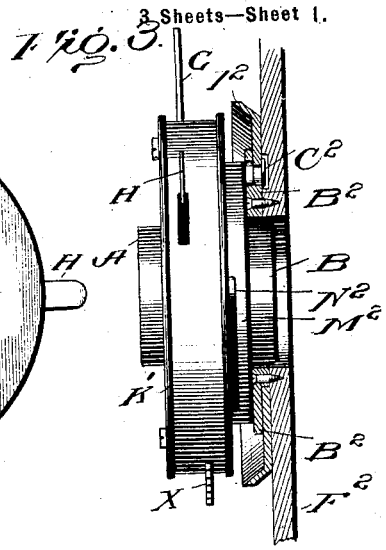
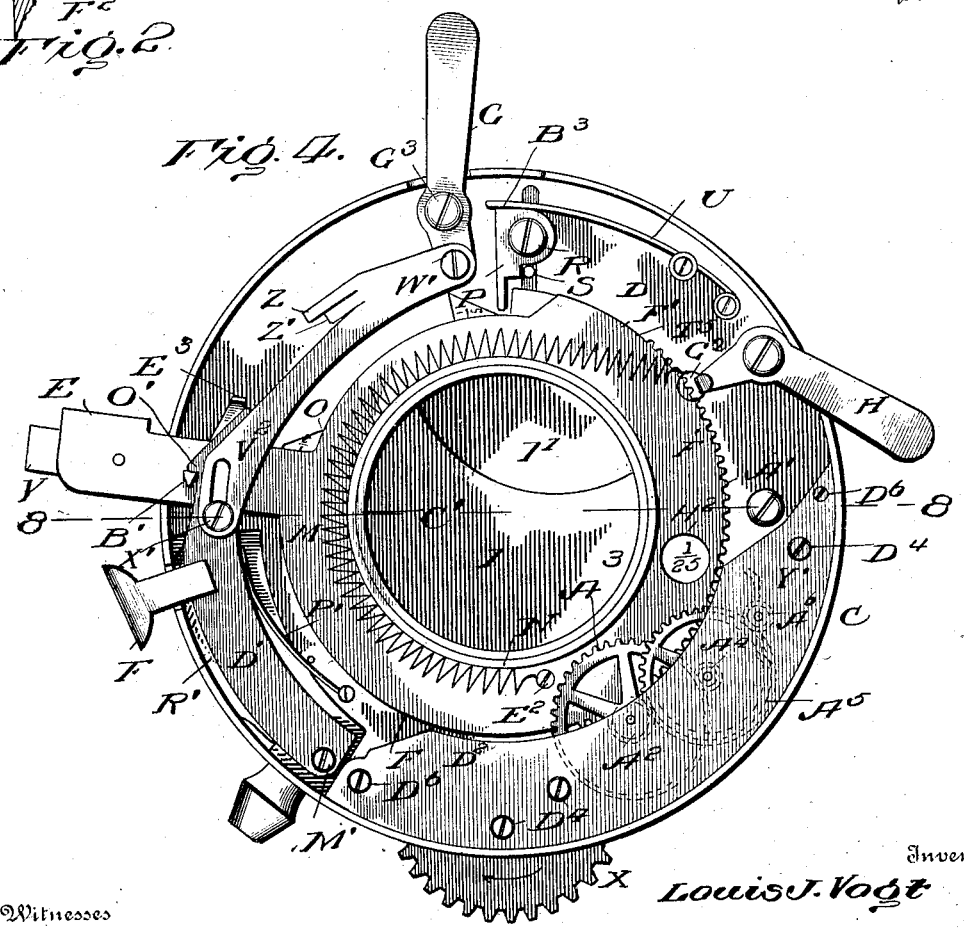
Witnesses
Jno Imrie
David W. Gould.
Inventor
Louis J. Vogt
by Geo. B. Selden.
Attorney

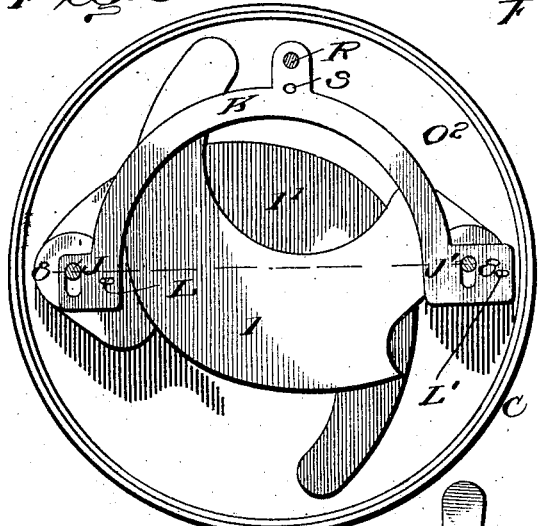
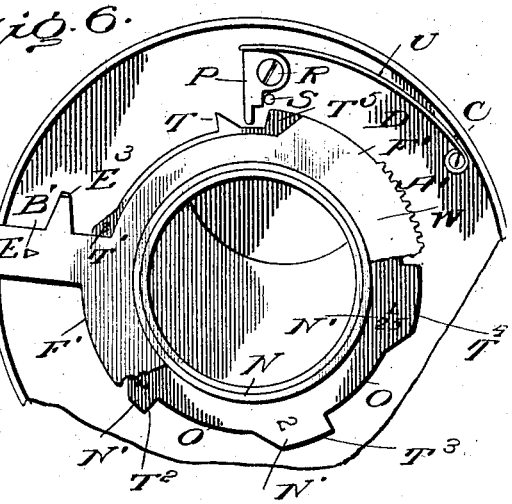
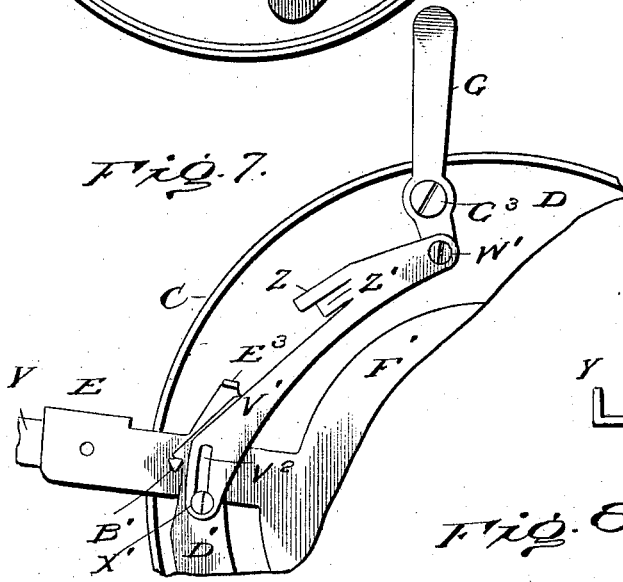
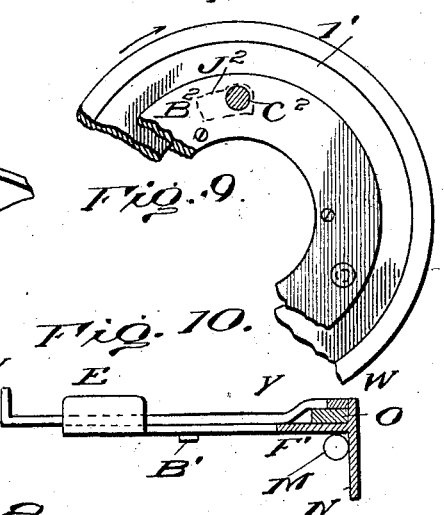
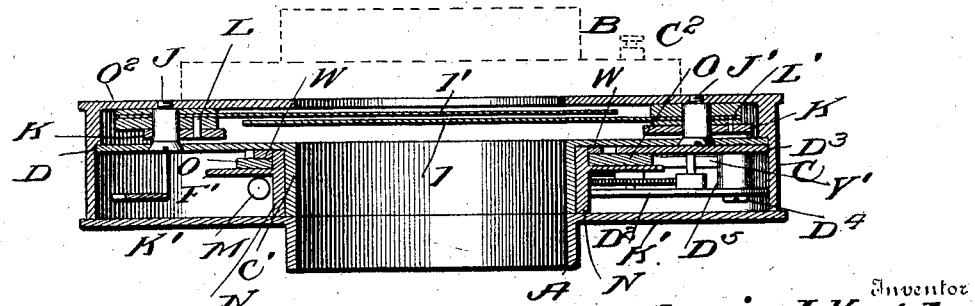

No. 647,342. Patented Apr. 10, 1900.
L. J. VOGT.
PHOTOGRAPHIC SHUTTER.
(Application filed Jan. 10, 1898.)
(Model.) 3 Sheets—Sheet 3.
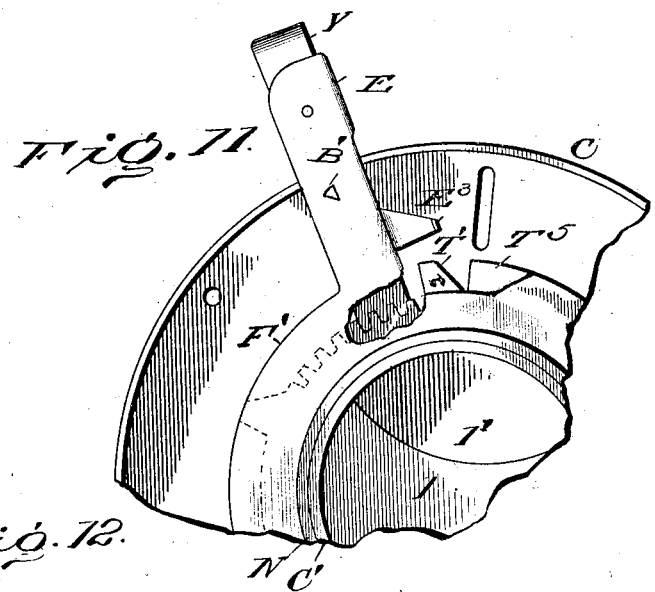
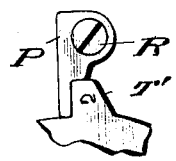
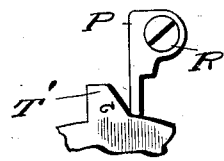
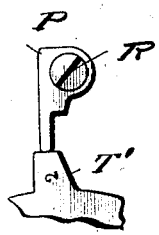
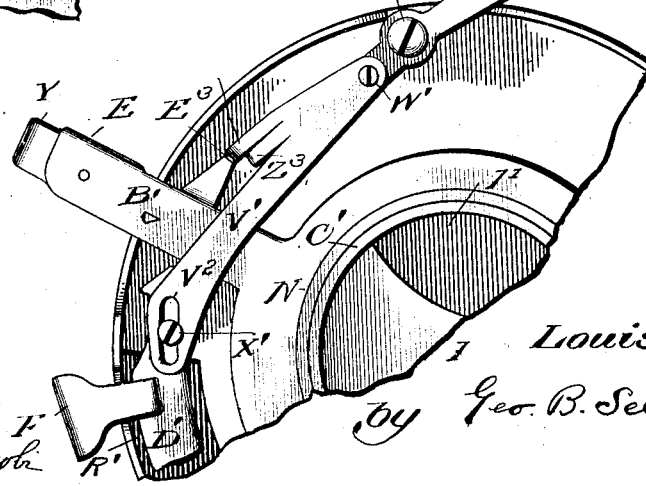
Inventor
Louis J. Vogt
by Geo. B. Selden
his Attorney
Witnesses

UNITED STATES PATENT OFFICE.

LOUIS J. VOGT, OF ROCHESTER, NEW YORK, ASSIGNOR, BY MESNE ASSIGNMENTS, TO THE GERMAN-AMERICAN BANK, OF SAME PLACE.

PHOTOGRAPHIC SHUTTER.

SPECIFICATION forming part of Letters Patent No. 647,342, dated April 10, 1900.

Application filed January 10, 1898. Serial No. 666,222. (No model.)

*To all whom it may concern:*

Be it known that I, LOUIS J. VOGT, a citizen of the United States, residing at Rochester, New York, have invented an Improved Photographic Shutter, of which the following is a specification, reference being had to the accompanying drawings.

My invention relates to an improved shutter for photographic cameras, which is fully described and illustrated in the following specification and the accompanying drawings, the novel features being specified in the claims annexed to the said specification.

In the accompanying drawings, representing my improved shutter, Figure 1 is a front view. Fig. 2 is a side view as seen from the left in Fig. 1. Fig. 3 is a side view as seen from the right in Fig. 1. Fig. 4 is an elevation, the front plate being removed. Fig. 5 is a front elevation showing the exposing-leaves and the actuating-beam. Fig. 6 is a partial front elevation showing the actuating-ring. Fig. 7 represents the time-exposure mechanism. Fig. 8 is a horizontal section on the line 8 8, Figs. 4 and 5, showing the parts below that line. Fig. 9 represents the bayonet-catch attachment. Fig. 10 represents the setting-lever. Figs. 11 to 16, inclusive, represent details.

In the accompanying drawings I have represented my improved shutter as constructed as part of an ordinary lens-mount, the lenses being inserted in the tubes A and B; but it will be understood that it can be used in any other relation with a photographic lens.

C is a suitable casing inclosing the exposing-leaves and their operating mechanism, which are placed on opposite sides of the perforated disk or diaphragm D.

E, Figs. 1 and 2, is the setting-lever, and F the exposing or releasing catch. G is the time-exposure lever, and H the lever for adjusting the tension of the spring.

I I', Figs. 5 and 8, are the exposing-blades, which are pivoted on the screws J J', being made of a shape adapted by opening and closing on their pivots, as indicated by the full and dotted lines in Fig. 5, to allow light to penetrate through the opening of the lens. The leaves are connected together, so as to be operated simultaneously by the arched beam K, which during an exposure moves bodily outward and back and causes the leaves to swing on their pivots by means of the pins L L'. The beam is slotted to permit it to slide on the screws J J'. The beam and leaves are actuated by the spiral spring M, wound about the barrel N, which rotates on the central tube C', attached to the diaphragm D, under the pull of the spring M, which is attached at $E^2$ to the flange F' on the barrel and at the other end to the inner end $G^2$ of the tension-lever H. As indicated in Fig. 4, the spring M is a coiled spiral wound about more or less of the periphery of the barrel. The barrel N is connected with a toothed ring O, which acts on a pawl P, attached to the beam K. The toothed ring is provided with a series of projecting teeth T, of different lengths, on the circumference, so that by adjusting the ring so as to bring different teeth to act on the pawl the times of exposure may be varied. Thus in Fig. 6 the tooth T, which produces the shortest exposure, is about to act on the pawl P, which is pivoted to the beam by the stud R, and to force the pawl and beam outward, the return movement being secured by the spring U, Figs. 4 and 6. This spring also holds the pawl in the proper operative position, the end of the pawl $B^3$, Fig. 4, being squared for this purpose.

S is a stop fixed in the beam and against which the pawl bears and slides when one of the teeth T forces it outward. The lower end of the pawl swings away from the stop S in setting the shutter, when the teeth move from right to left in Figs. 4 and 6. Exposures of any desired length may be secured by properly proportioning the teeth T. Thus T may be arranged to give an exposure of one twenty-fifth of a second; T', one-tenth; $T^2$, one-fifth; $T^3$, one-half; $T^4$, one, and $T^5$ two seconds.

In order to bring the required tooth into proper relation with the pawl P, the ring O, carrying the teeth T, is provided with the annular gear W, which meshes with the pinion X, which projects outside the casing, and the sliding dog Y is arranged so that the ring O may be disconnected from the setting-lever E. The dog Y is attached to the setting-lever in such fashion that it can slide thereon, and it is provided at its inner end with one or more catches or teeth which engage with the teeth of the annular gear W. When the slide Y is drawn outward, as indicated by the dotted lines in Fig. 4, the toothed ring O is disconnected from the setting-lever and is free to be rotated independently thereof. Then by turning the pinion X, the gear W and the toothed ring O are turned so as to bring any of the teeth on the ring into the proper operative relation with the pawl P. The arrow on the pinion X indicates the direction in which it should be turned so that the teeth T will cause the pawl P to swing away from the stop S, and the length of the exposure can be varied without opening the blades. The flange F' is partially cut away, so as not to interfere with the pawl P. The setting-lever E extends radially outward from the flange F'. The sliding dog Y is attached to the setting-lever, so that it may be shifted thereon inward or outward to engage the teeth on its inner end with the annular ring of teeth W or to disengage the dog therefrom. When the dog is pushed in, as indicated by the full lines in Figs. 4 and 10, the dog is engaged with the ring W, and the barrel N, the toothed ring O, the gear W, and the setting-lever will swing as one piece about the central axis of the lens-mount, the setting-lever being moved from E to E' to set the shutter before each exposure and from E' to E under the pull of the spring M in order to open the blades and allow the light to have access to the sensitive surface in the camera. To vary the length of the exposure by changing the tooth which acts on the pawl and the arched beam, the operator draws the dog Y outward, and thus disengages the setting-lever, barrel, and spring from the toothed ring and its gear, and then shifts the position of the ring until the proper tooth is brought opposite the pawl P by turning the pinion X, the edge of which projects beyond the casing for this purpose. In order to indicate to the operator when the required tooth is in proper relation with the pawl, I make a hole H², Figs. 4 and 6, through the flange F' and a corresponding hole H³ in the front plate K', and I provide the toothed ring O with a series of marks N', indicating the length of the exposure which the shutter will produce when the particular number shows through the openings H² H³. The numbers are so placed on the ring that they correspond with the particular tooth which acts on the pawl. Thus, for instance, in the case shown, when the shortest tooth is in position to move the pawl, the number "$\frac{1}{25}$th" comes opposite the openings. It will be observed that as the opening H² is made through the ring F', which swings with the setting-lever, the shutter must be set before the length of the exposure is arranged.

The exposing or releasing device consists of the stud or lug B', Figs. 4 and 7, the pivoted exposing-lever D', and the push or button F. The lever D' is pivoted at M' to the diaphragm, and it is provided with a lip or catch O', which engages with the pin B'. A spring P', Fig. 4, is arranged in any suitable way to urge the free end of the lever D' outward. The push F is attached to the lever D' in any suitable way.

In order to provide for making an exposure from a bulb, I employ an expansible bag R', Fig. 4, or other suitable device under the lever D' and arrange a nipple S' to communicate with it. A bulb being connected with the nipple pressure on the bulb operates the lever. The bag R' lies between the casing C and a flange on the inner side of the lever, and the entrance of air under pressure into the bag dilates it and produces the exposure. The nipple S' may be arranged to swing with the lever D' or the nipple may be screwed into a block U', to which the bag is attached and to which the lever is pivoted.

The mechanism for producing time exposures will be understood from Figs. 4 and 7. A link V' extends from the pivot W' at the inner end of the lever G to a pin or screw X' on the exposing-lever D'. The link V' has the stops Z Z' formed on it. The lever E has a projection E³ on it, which comes against the stop Z when the link is shifted into its path by placing the lever G at G'. The link V' is slotted, as shown at V², where it engages with the pin X' to permit the relative movements of the link and the lever. The time-lever G is pivoted to the diaphragm at G⁸. When the link V' is shifted outward by the movement of the lever G into the position indicated by the dotted lines in Figs. 4 and 7, the stop Z is interposed in the path of the lug E³, and the movement of the toothed ring O, with its teeth T, is arrested with blades open. The lug E³ first catches on the stop Z, and then on the release of the pressure on the push F or on the bulb the spring P' forces the lever D' outward, and this shifts the position of the link V', so that the lug E³ slips off of stop Z and engages with the stop Z', where it remains until another pressure on F or on the bulb moves the link inward and disengages the lug from the stop Z', so as to permit the closing of the blades by their actuating-spring M and the transmission mechanism described. The toothed ring O is preferably set with one of its longer teeth opposite the pawl for time exposures. The lug E³ is turned up on the end of an arm on the setting-lever, and the stops Z Z' are turned down from projecting portions of the link. The lever G is held in any position in which it may be placed by the friction of a spring-washer or other suitable device.

In order to further regulate the speed of the exposures and to make it uniform at all times, I employ a fly or fan Y', Figs. 4 and 8, which is connected to the flange or ring F' of the setting-lever by a suitable train of gearing, so as to be operated thereby. A segmental ring of teeth A', Fig. 4, is attached to or cut on the ring F', and this engages with the pinion A², which drives the gear A³, which through pinions and gears A⁴ A⁵ A⁶ imparts a rapid revolution to the fan when the shutter is in operation. The fan, gears, and pinions are carried by suitable shafts, supported at the inner ends by journals in the diaphragm D and at the outer ends by the plate D², secured to the diaphragm in any suitable way, or, as in the construction shown, the fan and its gearing and shafts are mounted between two plates D² D³, secured together by screws D⁴, passing through sleeves D⁵, Fig. 8, and thus making the fan and its driving mechanism removable as a whole from the casing.

D⁶ are screws which secure the fan mechanism in place.

I attach the shutter to the front F² of the camera by the detachable joint shown in Figs. 3 and 9. The circular plate B² is permanently attached to the front. The shutter has two or more studs C², having grooves cut around their projecting portions, and which enter corresponding holes in the plate B². Between the plate B² and the front is arranged the movable plate I², which is provided with slotted openings of the form shown at J², Fig. 9, adapted to admit the studs into the openings and to engage in the grooves around their heads when the plate is rotated a short distance, as indicated by the arrow in Fig. 9. The plate I² is free to turn on the plate B², which is shouldered to receive it. The edge of the plate I² is flanged outward or dished, and it is preferably milled in order to facilitate its manipulation. A single movement of the plate I² in either direction attaches or detaches the shutter from the camera, while the joint is absolutely light-tight. The edge of the slots in the plate I² may be beveled or inclined in order to draw the shutter tightly against the plate B².

The tension-lever H is held in place by friction produced by a spring-washer on its pivot.

M², Figs. 3 and 8, is a casing for an iris-diaphragm, and N² a lever for operating the same. If the iris-diaphragm is not used, the tube B is attached directly to the plate O² at the rear of the casing.

It will be understood that my improved shutter may be constructed with only one tooth T, attached to the ring F', the annular gear W and the pinion X being omitted. The train of gearing and the fly may be omitted; but by their use I secure greater uniformity in the lengths of the times of exposures. The shutter may also be built so that the gearing and fly may be thrown in and out of use at the will of the operator. The spring U bears on the shoulder B³ on the pawl P and holds it in contact with the stop S, while permitting it to swing away during the setting of the shutter or when the toothed ring O is rotated to vary the time of exposure. The tension-lever H may be omitted.

J J', Fig. 8, are screws which secure the diaphragm D to the rear plate of the lens-mount.

The casing C is shouldered interiorly to receive the edge of the diaphragm.

I claim—

1. The combination with the movable leaves, of the rotating actuating-ring, having teeth of lengths different circumferentially thereon, the train of gearing and the fly, substantially as described.

2. The combination with the movable leaves, of the arched beam having the pawl thereon, the rotating actuating-ring, the gearing and the fly, substantially as described.

3. The combination with the movable leaves, of the rotating actuating-ring, having teeth of lengths different circumferentially thereon, means for shifting said ring to secure varying exposures, the train of gearing and the fly, substantially as described.

4. The combination with the movable leaves, of the rotating actuating-ring, having teeth of lengths different circumferentially thereon, and a toothed ring attached thereto, a pinion meshing with said ring and projecting beyond the case, the train of gearing and the fly, substantially as described.

5. The combination with the movable leaves of the rotatable toothed actuating-ring, the tube or barrel connected thereto, and a suitable spring wound about the barrel, substantially as described.

6. The combination with the movable leaves of the rotatable actuating-ring, having teeth of different lengths thereon, the tube or barrel connected thereto, and a suitable spring wound about the barrel, substantially as described.

7. The combination with the pivoted leaves, of the arched beam, the pawl, the toothed actuating-ring and the spring for closing the blades, substantially as described.

8. The combination with the pivoted blades of the arched beam, the pawl pivoted thereon, a stop on the beam for the pawl, the return-spring which also holds the pawl against the stop, and suitable actuating mechanism, substantially as described.

9. The combination with the central tube C' of the barrel N arranged to rotate thereon, the coiled spring M wound about the barrel, the toothed actuating-ring, the pivoted blades, suitable intermediate operating mechanism, and suitable releasing mechanism, substantially as described.

10. The combination with the central tube C' of the barrel N arranged to rotate thereon, the coiled spring M wound about the barrel, the ring F' provided with the setting-lever and the toothed segment A', the train of gearing, the fly, the toothed actuating-ring, the pivoted blades, suitable intermediate operating and releasing mechanism, substantially as described.

11. As a means for operating an exposing-blade in a photographic shutter, a rotatable ring having teeth of different lengths, a spring for rotating the ring, suitable connecting blade-operating mechanism, and mechanism for varying the position of the ring relative to the connecting devices, whereby exposures of varying duration are secured, substantially as described.

12. The combination with the central tube C' of the rotating barrel N thereon, the spring M, the ring F' having setting-lever E attached thereto, the sliding dog Y on the setting-lever, the toothed ring O having annular gear W, the pivoted exposing-blades and suitable intermediate operating mechanism, substantially as described.

13. The combination with the central tube C' of the rotating barrel N thereon, the coiled spring M wound about said barrel, the ring F' with an actuating-tooth T, the setting-lever E, suitable releasing mechanism, the pivoted blade and suitable connecting operating mechanism, substantially as described.

14. The means for actuating the exposing mechanism of a photographic shutter, consisting of a rotating barrel, a suitable spring wound thereon, suitable connecting operating mechanism, and a releasing device, substantially as described.

15. The means for actuating the exposing mechanism of a photographic shutter, consisting of a rotating barrel, a coiled spiral spring wound thereon, suitable connecting operating mechanism, and a releasing device, substantially as described.

16. The combination, in a photographic shutter, of the diaphragm D, the pivoted blades and the arched beam on one side of the diaphragm, actuating mechanism on the other side consisting of a rotating toothed ring, an actuating-spring, and suitable releasing mechanism, substantially as described.

17. The combination with the pivoted exposing-blades of a photographic shutter, of the setting-lever E having lug E', the ring F', a tooth T arranged to operate the blades through suitable mechanism, the link V' having stops Z Z', and means for shifting the link into the path of the lug, substantially as described.

LOUIS J. VOGT.

Witnesses:
HENRY M. REICHENBACH,
GEO. B. SELDEN.